J. H. ASTRUCK.
CIGAR CUTTER.
APPLICATION FILED NOV. 18, 1912.
1,082,257.
Patented Dec. 23, 1913.
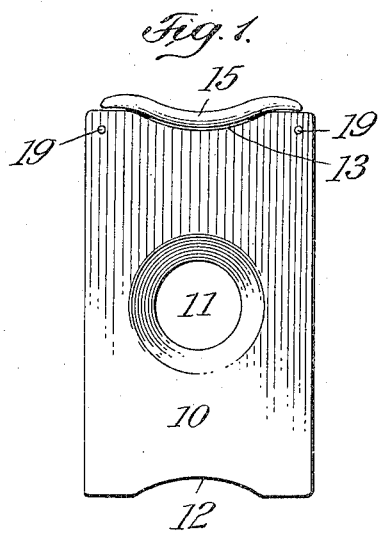
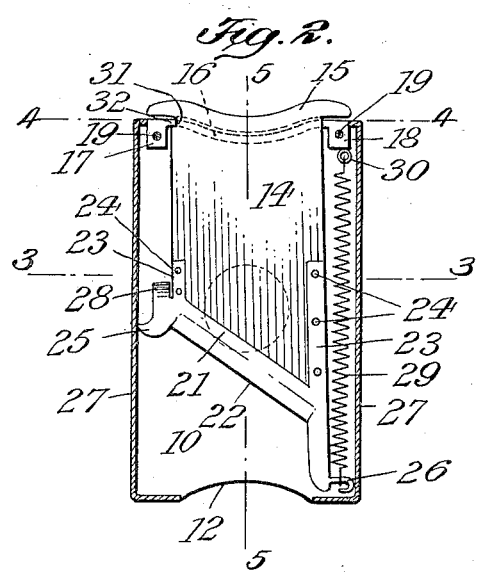
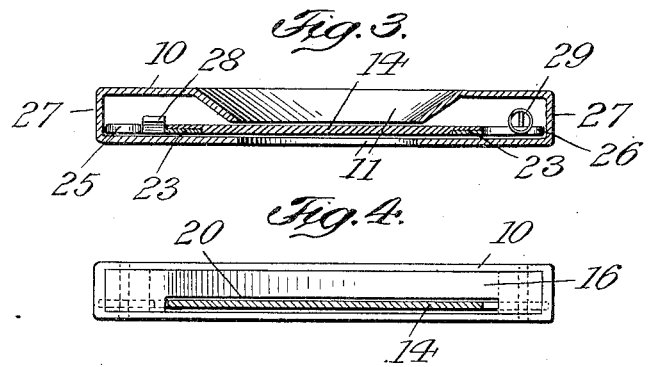
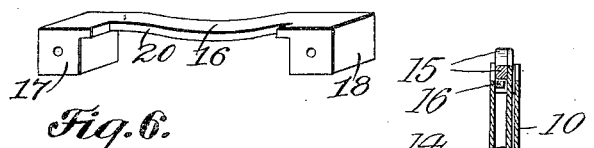
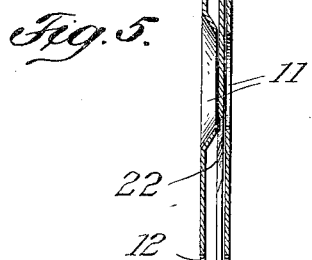
Witnesses:
Inventor
John H. Astruck
By his Attorneys

UNITED STATES PATENT OFFICE.

JOHN H. ASTRUCK, OF NEW YORK, N. Y.

CIGAR-CUTTER.

1,082,257.  Specification of Letters Patent.  Patented Dec. 23, 1913.

Application filed November 18, 1912. Serial No. 731,916.

*To all whom it may concern:*

Be it known that I, JOHN H. ASTRUCK, a citizen of the United States, residing at New York city, county and State of New York, have invented a new and Improved Cigar-Cutter, of which the following is a specification.

This invention relates to a cigar cutter of novel construction which may be easily manipulated and permits a ready removal of the cutting blade for sharpening and other purposes.

In the accompanying drawing: Figure 1 is a front view of my improved cigar cutter; Fig. 2 a longitudinal section thereof; Fig. 3 an enlarged cross section on line 3—3, Fig. 2; Fig. 4 a similar section on line 4—4, Fig. 2; Fig. 5 a longitudinal section on line 5—5, Fig. 2, and Fig. 6 a perspective view of the cover detached.

The casing 10 of the cigar cutter is of flat shape and is composed of a pair of parallel side plates, which are united along their right and left edges by narrow rims 27, while they are disconnected from each other along their lower and upper edges, which are concaved as at 12, 13 to constitute finger rests. Within casing 10 is reciprocably mounted a cutting member 14 carrying at its top a curved finger piece or grip 15, the shape of which corresponds substantially to that of the upper concaved edge 13, grip 15 constituting also a finger rest. In order to confine the cutting member 14 within the casing (when the cutter is in regular use) and to nevertheless permit a ready removal of such member from the casing for sharpening and other purposes, the following construction has been devised.

Into an upper opening of casing 10 is tightly fitted a cover 16 provided at its ends with a pair of depending lugs 17, 18. After the cover has been properly inserted into casing 10, it is held in position by a pair of transverse pins 19 driven into alined perforations of casing 10 and lugs 17, 18. Cover 16 is partly cut out to form a recess 20 which extends along one of the side plates, so as to form an oblong opening therebetween. This opening is adapted for the passage of a cutting blade or slide 14 which is normally located between the side plates and is thus guided along the inner face of one of said plates. Blade 14 is shown to be provided at its lower end with a steel shoe 21 having an oblique cutting edge 22 and a pair of upwardly extending shanks 23 that are riveted or otherwise secured to member 14 as at 24. In this way, the parts 14, 15 may be made of a comparatively soft metal so as to harmonize with the metal of which the casing is made, while the steel cutting blade 21 warrants a prolonged use of the device without requiring sharpening. Shoe 21 is further provided with a pair of lower guides 25, 26 that are adapted to slide along the narrow side walls 27 of casing 10, thereby insuring a true longitudinal movement of member 14. Guide 25 is furnished with a rearwardly deflected finger or stop 28 that limits the upward play of member 14 by abutting against lug 17. Guide 26 is shown to be made in the form of a hook, to which one end of a spring 29 is secured, the other end of said spring being attached to an eye 30 of lug 18. Spring 29 has the tendency to raise the cutting member 14, so as to permit the introduction of a cigar tip into opening 11. For locking member 14 in its lowered position after the cigar tip has been severed, said member is provided with a nick 31 which is adapted to be engaged by a corresponding shoulder 32 of cover 16. Nick 31 is located diagonally opposite to guide 26, so that the spring 29 by slightly tilting member 14 brings nick 31 into engagement with shoulder 32 and thus locks the blade in its closed position. It is obvious however, that the parts 31, 32 may be dispensed with, in which case the blade 14 will normally occupy its upper position, or that the spring may be altogether omitted without departing from the spirit of my invention. If the spring is omitted, grip 15 of member 14 is used for operating said member.

In assembling the parts illustrated in Fig. 2, member 14 is first placed into the recess 20 of cover 16 and spring 29 is suspended between hook 26 and lug 18. The parts 14, 16, 29 are now slid into casing 10, until the lug-apertures register with the casing-apertures, whereupon pins 19 are introduced. If the cutting blade requires a sharpening, replacing etc., pins 19 are removed and the parts 14, 16, 29 are withdrawn as will be readily understood.

It will be seen that my improved cigar cutter is of simple construction, reliable in operation, and that its component parts may be readily assembled or taken apart.

I claim:

1. A cigar cutter comprising a pair of side plates, a cover fitted between said side plates and provided with a recess extending along one of said plates to form an oblong opening therebetween, means for movably securing the cover to the side plates, and a reciprocable cutting blade normally located between the side plates and adapted to engage the oblong opening.

2. A cigar cutter comprising a pair of side plates, a recessed cover fitted between said plates and having a pair of depending apertured lugs, pins passing through said side plates and lugs and adapted to detachably secure the cover to the side plates, and a reciprocable cutting blade engaging said cover.

3. A cigar cutter, comprising a casing, a recessed cover removably secured thereto, a manually operable slide received within the cover-recess, a shoe having an oblique cutting edge and a pair of parallel shanks that are riveted to the slide, a pair of guides on the shoe that engage opposed casing-walls, and a stop on the shoe adapted to abut against the cover.

JOHN H. ASTRUCK.

Witnesses:
ARTHUR E. ZUMPE,
KATHERYNE KOCH.

Copies of this patent may be obtained for five cents each, by addressing the "Commissioner of Patents, Washington, D. C."